United States Patent [19]

Muijs et al.

[11] Patent Number: 5,061,386

[45] Date of Patent: Oct. 29, 1991

[54] SURFACTANT COMPOSITION

[75] Inventors: Herman M. Muijs; Jan V. Schaik, both of Amsterdam, Netherlands

[73] Assignee: Shell Oil Company, Houston, Tex.

[21] Appl. No.: 553,044

[22] Filed: Jul. 16, 1990

[51] Int. Cl.$^5$ ............... E21B 43/16; E21B 43/25; B01D 17/04

[52] U.S. Cl. ............... 252/8.551; 252/8.5554; 252/8.515; 252/351; 252/358; 252/312; 252/357; 166/304; 166/308; 166/273

[58] Field of Search ............... 252/8.551, 8.554, 8.515, 252/351, 358, 312, 357; 166/304, 273, 308

[56] References Cited

U.S. PATENT DOCUMENTS

| | | | |
|---|---|---|---|
| 3,125,517 | 3/1964 | Voda | 252/8.5 |
| 3,150,085 | 9/1964 | Mallory | 252/8.5 |
| 3,323,593 | 6/1967 | Foshee et al. | 166/42 |
| 3,495,664 | 2/1970 | Kelly | 175/69 |
| 3495,665 | 2/1970 | Kelly et al. | 175/69 |
| 3,525,688 | 8/1970 | Swanson | 252/8.5 |
| 3,528,914 | 9/1970 | Darley | 252/8.5 |
| 3,601,194 | 8/1971 | Gallus | 166/283 |
| 3,612,182 | 10/1971 | Raifsnider | 166/307 |
| 3,710,865 | 1/1973 | Kiel | 166/308 |
| 3,962,151 | 6/1976 | Dekker et al. | 252/548 |
| 3,974,116 | 8/1976 | Lissant | 260/29.2 |
| 3,977,472 | 8/1976 | Graham et al. | 166/308 X |
| 3,979,305 | 9/1976 | Fischer et al. | 252/8.5 C |
| 4,061,580 | 12/1977 | Jahnke | 252/8.551 |
| 4,088,583 | 5/1978 | Pyle et al. | 252/8.5 A |
| 4,089,803 | 5/1978 | Bessler | 252/8.554 X |
| 4,146,499 | 3/1979 | Rosano | 252/8.554 X |
| 4,209,422 | 6/1980 | Zimmerman et al. | 252/358 X |
| 4,233,165 | 11/1980 | Salathiel et al. | 252/8.55 R |
| 4,321,147 | 3/1982 | McCoy et al. | 252/331 X |
| 4,324,669 | 4/1982 | Normal et al. | 252/8.55 C |
| 4,406,798 | 9/1983 | Miller et al. | 252/8.55 D |
| 4,442,241 | 4/1984 | Drake | 523/130 |
| 4,442,897 | 4/1984 | Crowell | 166/308 X |
| 4,446,054 | 5/1984 | Bessler | 252/8.554 X |
| 4,595,511 | 6/1986 | Seybold et al. | 22/8.552 |
| 4,719,021 | 1/1988 | Branch | 252/8.514 |
| 4,828,724 | 5/1989 | Davidson | 252/312 X |

FOREIGN PATENT DOCUMENTS 59-006299  5/1982  Japan .

*Primary Examiner*—Robert L. Stoll
*Assistant Examiner*—Chhaya Sayala

[57] ABSTRACT

Surfactant composition comprising an alkyl amine ethoxylate and a gel breaker, wherein the gel breaker is a random copolymer of ethylene oxide with propylene oxide/or butylene oxide.

2 Claims, No Drawings

SURFACTANT COMPOSITION

BACKGROUND OF THE INVENTION

The present invention relates to a surfactant composition comprising an alkyl amine ethoxylate for use in an aqueous liquid. Such an aqueous liquid can be a drilling fluid or a fluid used to stimulate oil production from a subterranean reservoir. The alkyl group of the alkyl amine ethoxylate contains suitably between 10 and 20 carbon atoms and more suitable between 16 and 18 carbon atoms; the number of ethylene oxide groups is suitably between 3 and 15 and more suitably between 10 and 15.

At ambient temperature alkyl amine ethoxylate is a viscous waxlike liquid, which if mixed with water at ambient temperature and at a concentration between about 15 percent by mass and 80 percent by mass forms a gel. Therefore when a volume of alkyl amine ethoxylate is mixed with water a gel is formed on the outer surface of the volume, so that the volume is covered with a skin through which water can pass slowly. In order to dissolve the volume of alkyl amine ethoxylate the mixture has to be stirred to break the volume in smaller parts. Complete dissolution will only occur when the alkyl amine ethoxylate concentration is below about 15 percent by mass.

SUMMARY OF THE INVENTION

It is an objective of the present invention to provide a surfactant composition which includes an alkyl amine ethoxylate and which dissolves faster in an aqueous liquid.

To this end the surfactant composition according to the invention comprises an alkyl amine ethoxylate and a gel breaker, wherein the gel breaker is a random copolymer of ethylene oxide with propylene oxide and/or butylene oxide.

Suitably the mass ratio between alkyl amine ethoxylate and the gel breaker is in the range of from 3 to 15. The contribution of the ethylene oxide groups to the molecular weight of gel breaker is in the range of from 300 to 900.

Suitably the molar ratio of ethylene oxide groups in the gel breaker and propylene oxide and/or butylene oxide groups is in the range of from 10 to 20.

The invention further relates to an oil well fluid for use in drilling a borehole in a subterranean formation, or for use in overhauling a borehole, which fluid comprises a stable oil-in-water emulsion including between 50% v and 96% v of an aqueous phase, between 3% v and 40% v of an oil phase, and between 1% v and 10% v of the surfactant composition according to the invention.

The invention also relates to an oil production fluid, such as a fluid used to stimulate oil production from a subterranean reservoir, which fluid comprises a stable oil-in-water emulsion including between 50% v and 96% v of an aqueous phase, between 3% v and 35% v of an oil phase, and between 1% v and 15% v of the surfactant composition according to the invention.

DESCRIPTION OF PREFERRED EMBODIMENTS

The experiments which will be described hereinafter were carried out to determine the solubility rate of $0.2 \times 10^{-3}$ liter of a surfactant composition in $100 \times 10^{-3}$ liter of an aqueous liquid.

The experiments were carried out with the use of a transparent vessel arranged on a thermostat, and which vessel was provided with a stirrer, a light source, and an apparatus for monitoring the absorbance of light in the liquid. To facilitate monitoring the absorbance, to the surfactant composition was added $100 \times 10^{-6}$ liter of a dye solution consisting of 5% w fluoresc in disodium salt in 2-methyl-2,4-pentandiol. As the surfactant composition dissolved in the stirred liquid, the absorbance increased, and the surfactant composition was completely dissolved when the absorbance remained constant. The solubility rate is the time elapsed until complete solution of the surfactant composition, this time being expressed in minutes.

The cloud point as included in the table was determined for 0.05 kg of the surfactant composition dissolved in 1 kg of brine, wherein the brine contains 0.1 kg of potassium chloride in water.

The storage test comprised storing the surfactant composition for 48 hours at 0° C., the appearance of the surfactant composition at the end of the period being included in the table.

The alkyl amine ethoxylate as used in the experiments has an alkyl group including between 16 and 18 carbon atoms and 12 ethylene oxide groups.

Surfactant composition A (according to the invention) comprises 80 percent by mass of alkyl amine ethoxylate and 20 percent by mass PEG 600 PR (a trade name of Hoechst) which is a random copolymer of ethylene oxide and 7 mol percent propylene oxide with an average molecular weight of 600.

Surfactant compositions B, C, D, E, F, G, and H were prepared not according to the invention to carry out comparative experiments.

Surfactant composition B (not according to the invention) comprises 100 percent by mass of alkyl amine ethoxylate.

Surfactant composition C (not according to the invention) comprises 80 percent by mass of alkyl amine ethoxylate and 20 percent by mass of a polyethylene glycol with an average molecular weight of 400.

Surfactant composition D (not according to the invention) comprises 80 percent by mass of alkyl amine ethoxylate and 20 percent by mass of a polyethylene glycol with an average molecular weight of 600.

Surfactant composition E (not according to the invention) comprises 80 percent by mass of alkyl amine ethoxylate and 20 percent by mass of a polypropylene glycol with an average molecular weight of 400.

Surfactant composition F (not according to the invention) comprises 80 percent by mass of alkyl amine ethoxylate and 20 percent by mass of a polypropylene glycol with an average molecular weight of 2,000.

Surfactant composition G (not according to the invention) comprises 80 percent by mass of alkyl amine ethoxylate and 20 percent by mass of SYNPERONIC PE/L31 (a trade name of ICI) a block copolymer of propylene oxide and ethylene oxide containing 10 mol percent ethylene oxide and having an average molecular weight of 1,100.

Surfactant composition H (not according to the invention) comprises 80 percent by mass of alkyl amine ethoxylate and 20 percent by mass of SYNPERONIC PE/L61 (a trade name of ICI) a block copolymer of propylene oxide and ethylene oxide containing 10 mol percent ethylene oxide and having an average molecular weight of 2,090.

Results of the experiments:

| Surfactant Composition | Cloud Point (°C.) | Solubility Rate (min.) | Cold Storage |
|---|---|---|---|
| A | 82 | 4.2 | h. liq. |
| B | 82 | 19 | h. liq. |
| C | 82 | 7.6 | h. liq./sol. |
| D | 82 | 2.8 | solid |
| E | 70 | 9.6 | h. liq. |
| F | phase sep. | 15 | h. liq. |
| G | 44 | 20 | h. liq. |
| H | 24 | 20 | h. liq. |

In the table, "phase sep." indicates phase separation, "h. liq." indicates hazy or misty liquid, and "h. liq./sol." indicates a state in between hazy liquid and solid.

From the experiments it can be concluded that the surfactant composition according to the present invention (surfactant composition A) remains liquid at low temperatures and dissolves rapidly in water.

What is claimed is:

1. An oil well fluid comprising a stable oil-in-water emulsion including between 50% v and 96% v of an aqueous phase, between 3% v and 40% v of an oil phase, and between 1% v and 10% v of a surfactant composition comprising an alkyl amine ethoxylate and a gel breaker which is a random copolymer of ethylene oxide with at least propylene oxide or butylene oxide, the mass ratio between the alkyl amine ethoxylate and the gel breaker being in the range of from 3 to 15; the contribution of the ethylene oxide groups to the molecular weight of gel breaker being in the range of from 300 to 900; and the molar ratio of ethylene oxide groups in the gel breaker and one of propylene oxide and butylene oxide groups being in the range of from 10 to 20.

2. The oil well fluid of claim 1 wherein the alkyl amine ethoxylate has an alkyl group including between 16 and 18 carbon atoms and 12 ethylene oxide groups.

* * * * *